United States Patent Office 3,369,862
Patented Feb. 20, 1968

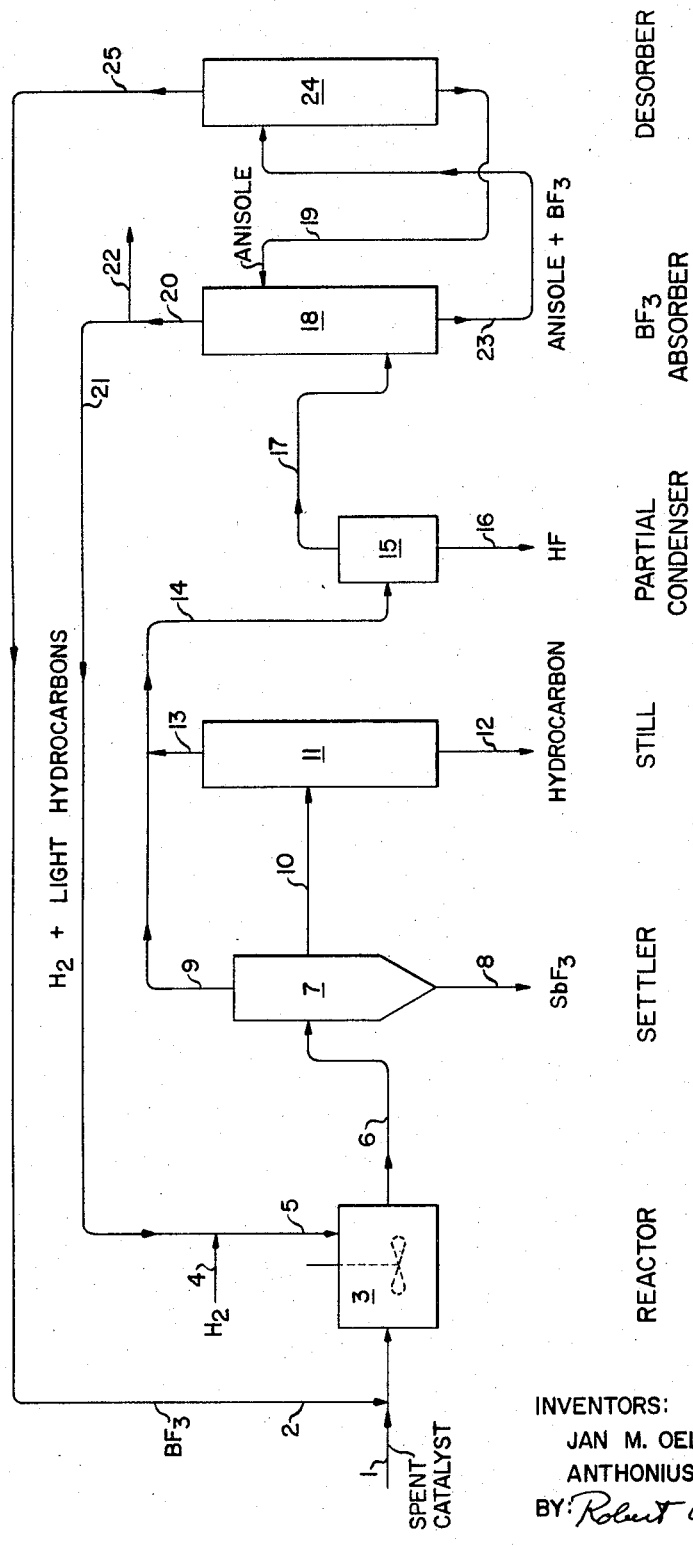

3,369,862
PROCESS FOR PRODUCING ANTIMONY TRIFLUORIDE, AND FOR REGENERATING SPENT HEXAFLUOROANTIMONIC ACID CATALYSTS
Jan M. Oelderik and Anthonius M. Meijer, Amsterdam, Netherlands, assignors to Shell Oil Company, New York, N.Y., a corporation of Delaware
Filed Sept. 28, 1964, Ser. No. 396,733
Claims priority, application Netherlands, Dec. 2, 1963, 301,210
3 Claims. (Cl. 23—88)

ABSTRACT OF THE DISCLOSURE

Spent hexafluoroantimonic acid catalysts are regenerated by decomposition with hydrogen in the presence of tetrafluoroboric acid to form lower molecular weight hydrocarbons and antimony trifluoride which may then be converted to antimony pentafluoride or hexafluoroantimonic acid by sequential treatment with chlorine and hydrofluoric acid.

---

The invention relates to a process for the decomposition of complex compounds of hexafluoroantimonic acid and hydrocarbons. It relates in particular to the decomposition of stable complexes which form during conversion of hydrocarbons with hexafluoroantimonic acid catalysts.

The use of hexafluoroantimonic acid catalysts for hydrocarbon conversions is described in Oelderik et al., U.S. 3,201,494, issued Aug. 17, 1965. These catalysts are very strong acids with extreme catalytic activity. These compounds have the formula $RSbF_6$, where R is hydrogen or a saturated cyclic hydrocarbon radical having from about 4 to 10 carbons, and are particularly suitable for conversions such as paraffin isomerization, disproportionation, and alkylation, which require strongly acidic catalysts.

As in conversions with other Friedel-Crafts catalysts, hexafluoroantimonic acid catalysts are subject to gradual deactivation attributable to formation of stable, catalytically inert complexes which are produced through undesirable side reactions of the acid with, e.g., intermediate products and feed impurities. These catalyst/hydrocarbon complexes are substantially insoluble in the hydrocarbon phase and accumulate in the catalyst, causing loss of important catalyst activity. The catalyst complexes are very difficult to analyze and have the appearance of a brown, viscous oil, unlike other spent Friedel-Crafts catalysts which take the form of a black, tarry mass.

It has now been discovered that hexafluoroantimonic acid complexes can be substantially completely decomposed to antimony trifluoride and lower mol weight hydrocarbons at elevated temperatures in the presence of hydrogen and tetrafluoroboric acid ($HBF_4$). The resulting antimony trifluoride can then be converted to antimony pentafluoride or directly to hexafluoroantimonic acid by treatment with fluorine or chlorine and HF.

Hydrogenative decomposition of the spent catalyst is effected at a temperature from about 20° to about 200° C. at hydrogen partial pressures of 30 to about 200 atmospheres, preferably 50 to 150 atmospheres. Preferred temperatures are 40° to 185° C., especially 90° to 160° C. Duration of the reaction varies with temperature and pressure, complex stability, and $HBF_4$ concentration; in general, decomposition is substantially completed in about ½ to 20 hours. Tetrafluoroboric acid is desirably present in the amount of 0.001 to 10 moles, preferably 0.01 to 1 mole per mole of complex to be decomposed.

Hydrogenative decomposition according to the invention is preferably carried out under conditions such that the complex is substantially in the liquid phase. As the hexafluoroantimonic acid complexes are usually very viscous, it is desirable to conduct the decomposition in the presence of a low-viscosity solvent as diluent. A particularly suitable diluent is hydrofluoric acid. In general, 1–10 parts by volume of diluent per part by volume of complex is appropriate. As a rule, dilution of the spent catalyst may not be necessary in those cases where the fresh intake catalyst already contains hydrofluoric acid or another diluent such as an alkyl fluoride.

Hydrogen used for hydrogenative decomposition of the complexes need not necessarily be pure; hydrogen-containing gas mixtures, such as gases produced during reforming of hydrocarbon oils, can be conveniently applied. The hydrogen-containing gases should preferably be water-free or substantially water-free and contain no or substantially no sulfur compounds such as hydrogen sulfide. Hydrogen consumption varies from about 0.2 to 0.5 m.³ per kg. of complex. In order to maintain substantially constant hydrogen partial pressure in the reactor during the reaction, it is usually desirable to employ a relatively large excess of hydrogen, e.g., from 2 to 6 times the hydrogen consumption.

In those cases where the complex is diluted with HF, tetrafluoroboric acid can be prepared in situ in a simple manner by introducing gaseous boron trifluoride into the solution containing HF, thereby spontaneously forming $HBF_4$. The concentration of tetrafluoroboric acid is proportional to the $BF_3$ partial pressure in the gas phase; thus, the concentration in the liquid phase can be easily regulated.

The hydrogenative decomposition can be applied to any type of hexafluoroantimonic acid/hydrocarbon complexes. If the hydrocarbon radical in the complex is of a paraffinic nature, the decomposition can, as a rule, be effected under milder conditions of temperature and hydrogen pressure than in the case where the hydrocarbon radical contains ring structures which may be formed, for instance, in the conversion of starting materials that are rich in naphthenes.

Although the effectiveness of the tetrafluoroboric acid in promoting decomposition of the hexafluoroantimonic acid complexes is not entirely understood, it is believed that $HBF_4$ has a purely catalytic function in the process. This is evidenced by the fact that after decomposition of the complexes, the tetrafluoroboric acid used is present unchanged in the reaction product and can be recovered substantially quantitatively. The effectiveness of $HBF_4$ as a decomposition catalyst in this process is surprising since the complexes are stable in strong acids under hydrogenation conditions. Attempts to destroy these complexes in liquid $HSbF_6$ and in $HF$-$HSbF_6$ mixtures under hydrogenation conditions were fruitless. Although in theory hydrogenative decomposition could be effected in the presence of an acid stronger than $HSbF_6$, such an acid is not known. The effectiveness of $HBF_4$ is unexpected since it is a considerably weaker acid than $HSbF_6$; for example, catalytic activity of $HBF_4$ for paraffin isomerization is only about 1% of that of $HSbF_6$. Furthermore, the catalytic action of tetrafluoroboric acid toward the decomposition of the present complexes is apparently specific. To illustrate this, decomposition experiments were carried out with other fluorides which are stable in hexafluoroantimonic acid. It was found that titanium fluoride, tantalum fluoride and niobium fluoride do not promote decomposition of hexafluoroantimonic acid complexes originating from a spent catalyst.

As a result of the hydrogenation reaction, the hydrocarbon radical of the complex is decomposed into saturated lower hydrocarbons, largely $C_1$–$C_5$ paraffins. The pentavalent antimony is reduced to antimony trifluoride, which deposits as a fine white powder on the bottom of the reactor. After separation and possible elution, the pulverous antimony trifluoride can be converted in a simple manner into antimony pentafluoride and/or hexafluoroantimonic acid, thereby completing regeneration of the spent hexafluoroantimonic acid catalyst. Antimony trifluoride is first converted with chlorine into a mixed fluoride-chloride of pentavalent antimony ($SbF_3Cl_2$), which is subsequently converted into antimony pentafluoride by treatment with liquid hydrofluoric acid, displacing hydrochloric acid or into hexafluoroantimonic acid if excess hydrofluoric acid is used.

This preferred embodiment of the invention may be summarized as follows. Spent catalyst, which contains liquid hydrofluoric acid as diluent, is contacted with gaseous boron trifluoride and hydrogen in a corrosion-resistant reactor under a hydrogen partial pressure of 30 to 100 atm. After an average residence time in the reactor of 5 to 15 hours, the reaction mixture is separated into gaseous constituents, liquid hydrocarbons and solid antimony trifluoride. From the gaseous constituents, which comprise a mixture of hydrogen, hydrofluoric acid, boron trifluoride and gaseous hydrocarbons, hydrofluoric acid is separated by cooling and then boron trifluoride is removed by absorption, in, for instance, anisole. Recovered boron trifluoride and the remaining gas, which consists largely of hydrogen and hydrocarbons, may be wholly or partly recycled into the process. The pulverous antimony trifluoride that has been separated is subsequently converted with chlorine into a fluoride-chloride of pentavalent antimony ($SbF_3Cl_2$), which is converted into hexafluoroantimonic acid by means of an excess of liquid hydrofluoric acid.

Since hexafluoroantimonic acid is extremely corrosive, the regeneration reaction is preferably effected in an apparatus consisting of or lined with material that can withstand hexafluoroantimonic acid and/or hydrofluoric acid at the specified temperatures. Examples of suitable metals are platinum and aluminum; examples of alloys are platinum-gold alloys, nickel-molybdenum and/or nickel-tungsten alloys (Hastelloy-B and Hastelloy-C) as well as aluminum-magnesium alloys; examples of synthetic materials are polytrifluorochloroethylene (Kel-F), and polytetrafluoroethylene (Teflon).

A preferred method of operating the regeneration process of the invention is illustrated in the drawing. Auxiliary devices such as pumps, heat exchange media, controls, etc. which are obvious to those skilled in the art have been omitted.

Referring to the drawing, spent hexafluoroantimonic acid catalyst containing liquid HF diluent from line 1 is continuously mixed with gaseous $BF_3$ from line 2. The resulting feed mixture is supplied to stirred Hastelloy-C reactor 3, wherein the liquid HF and $BF_3$ react to form the $HBF_4$ catalyst. A hydrogen pressure of 50 atm. is maintained by supplying hydrogen through lines 4 and 5. Product is withdrawn from the reactor through line 6 after complex decomposition is substantially complete. Solid white $SbF_3$ is recovered in settler 7 and removed through line 8. Gaseous product comprising $H_2$, $BF_3$, HF, and light hydrocarbons are removed from the settler via line 9. A stream from the liquid phase of the settler flows through line 10 to distillation column 11, wherein $BF_3$, HF, $H_2$, and lower hydrocarbons are separated from higher hydrocarbons and are removed overhead and combined with the stream from line 9. This mixture is passed through line 14 to partial condenser 15, from which liquid HF is removed through line 16. The remaining gas mixture passes through line 17 to column 18 wherein $BF_3$ is removed by countercurrent absorption in anisole which is introduced through line 19. Hydrogen and gaseous hydrocarbons are withdrawn at the top through line 20, and partially recycled to the reactor through lines 21 and 5. The anisole phase containing $BF_3$ is passed through line 23 to desorption column 24 wherein $BF_3$ is desorbed at about 40° to be recycled through lines 25 and 2 to the reactor. Regenerated anisole is recycled through line 19 to column 18.

The following example is intended to illustrate but not limit the invention.

EXAMPLE I

Spent catalyst from a $C_5$–$C_6$ isomerization reaction catalyzed by $HSbF_6$ contained 50 parts by weight of hydrofluoric acid and 17 parts by weight of antimony-containing hydrocarbon complex having 6 parts by weight of antimony. A number of hydrogenative decomposition experiments were carried out with this spent catalyst at temperatures of 95 and 150° C. and reaction times of 5 and 20 hours with and without the use of tetrafluoroboric acid. The experiments were performed in a magnetically stirred reactor lined with Teflon. All reactions were carried out under a total pressure of 100 atm. Results of the experiments are tabulated in Table I. Antimony recovery is calculated as the amount of antimony recovered as $SbF_3$ compared to the amount of antimony in the complex.

TABLE I

| Experiment No. | I | II | III | IV | V |
|---|---|---|---|---|---|
| Boron trifluoride,[1] parts by wt | 0 | 13 | 13 | 13 | 0 |
| Temperature, ° C | 95 | 95 | 95 | 150 | 150 |
| Reaction time, hours | 20 | 20 | 5 | 20 | 20 |
| Antimony recovered, percent | 15 | 80 | 55 | 100 | 40 |

[1] Tetrafluoroboric acid is formed in situ from boron trifluoride and hydrofluoric acid; the greater part of the $BF_3$ remains as such in the vapor phase.

The results of Experiments I and V indicate that unsatisfactory conversions are achieved in the absence of tetrafluoroboric acid even under extreme conditions (150° C.). On the other hand, good recoveries were obtained in experiments II and IV, conducted in the presence of tetrafluoroboric acid under the same conditions as experiments I and V. The important catalytic effect is further illustrated by a comparison of experiments I and III; in experiment I, conversion was only 15% after 20 hours, while in $HBF_4$-catalyzed experiment III, conversion was 55% after only 5 hours.

We claim as our invention:

1. A process for hydrogenative decomposition of hexafluoroantimonic acid/hydrocarbon complexes which comprises hydrogenating the complex at a temperature of from about 20° C. to about 200° C. in the liquid phase and a hydrogen pressure of from 30 to about 200 atmospheres in the presence of 0.001 to 10 moles of tetrafluoroboric acid per mole of complex, and recovering solid antimony trifluoride and gaseous hydrocarbons.

2. A process for hydrogenative decomposition of hexafluoroantimonic acid/hydrocarbon complexes which comprises hydrogenating the complex for ½ to about 20 hours at a temperature of from about 20° C. to about 200° C. in the liquid phase and a hydrogen partial pressure of from about 30 to about 200 atmospheres in the presence of 0.001 to 10 moles of tetrafluoroboric acid per mole of complex, and recovering solid antimony trifluoride and gaseous hydrocarbons.

3. A process for regenerating spent hexafluoroantimonic acid catalyst which comprises hydrogenating hexafluoroantimonic acid/hydrocarbon complex at a temperature of from 20° C. to about 200° C. at a hydrogen pressure of from 30 to 200 atmospheres in the liquid phase in the presence of 0.001 to 10 moles of tetrafluoroboric acid per mole of complex, recovering solid antimony trifluoride and gaseous hydrocarbon, reacting the antimony trifluoride with chlorine to form a mixed halide of pentavalent antimony, and reacting the mixed halide with an excess of HF to produce hexafluoroantimonic acid.

No references cited.

OSCAR R. VERTIZ, *Primary Examiner.*

B. H. LEVENSON, *Assistant Examiner.*